Feb. 16, 1971  W. F. BOWLER  3,563,639
SELF-TRACKING MIRROR DEVICE WITH MANUAL OVER-RIDE FOR VEHICLES
Filed Aug. 6, 1969  3 Sheets-Sheet 1
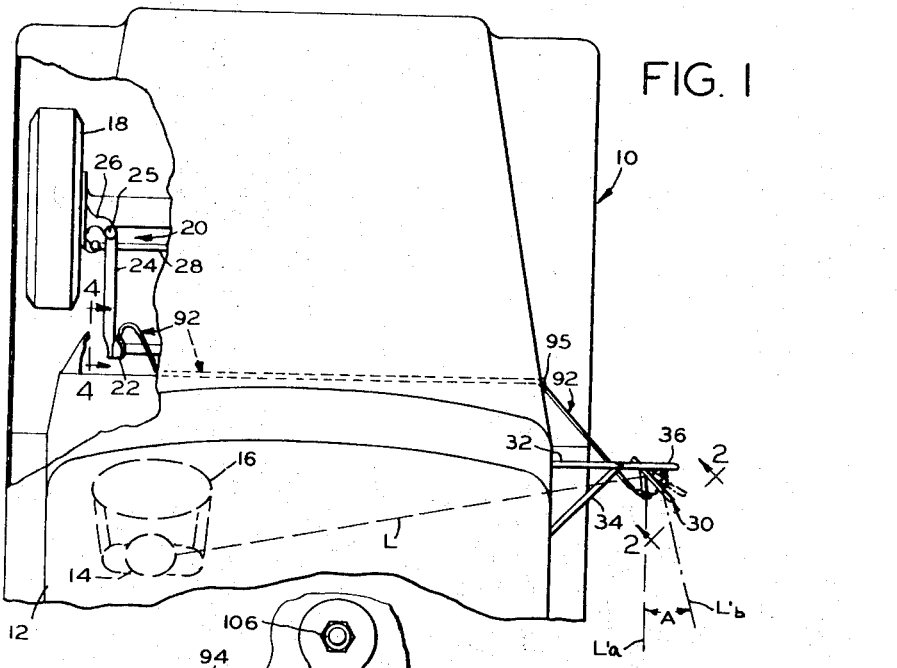
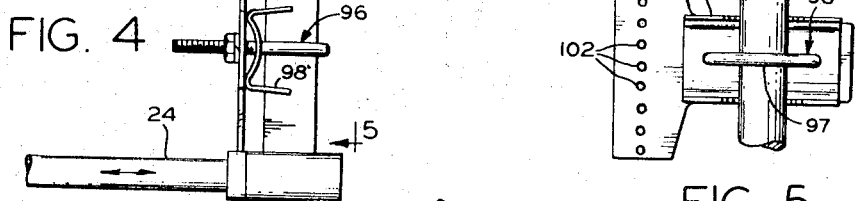
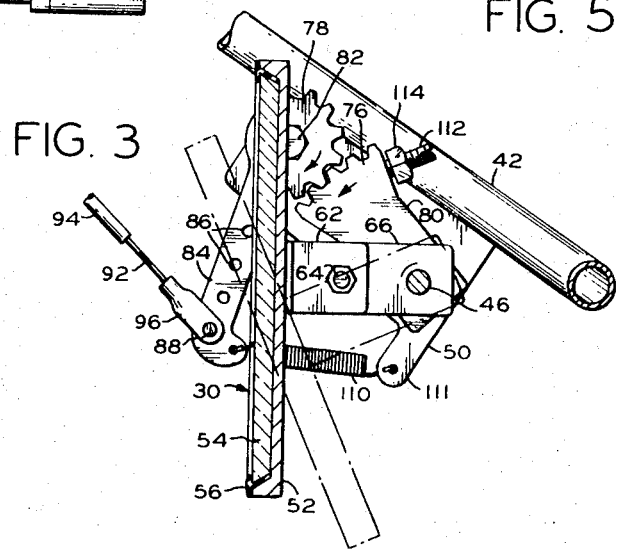
WILLIAM F. BOWLER
INVENTOR
BY
BUCKHORN, BLORE, KLARQUIST & SPARKMAN
ATTORNEYS

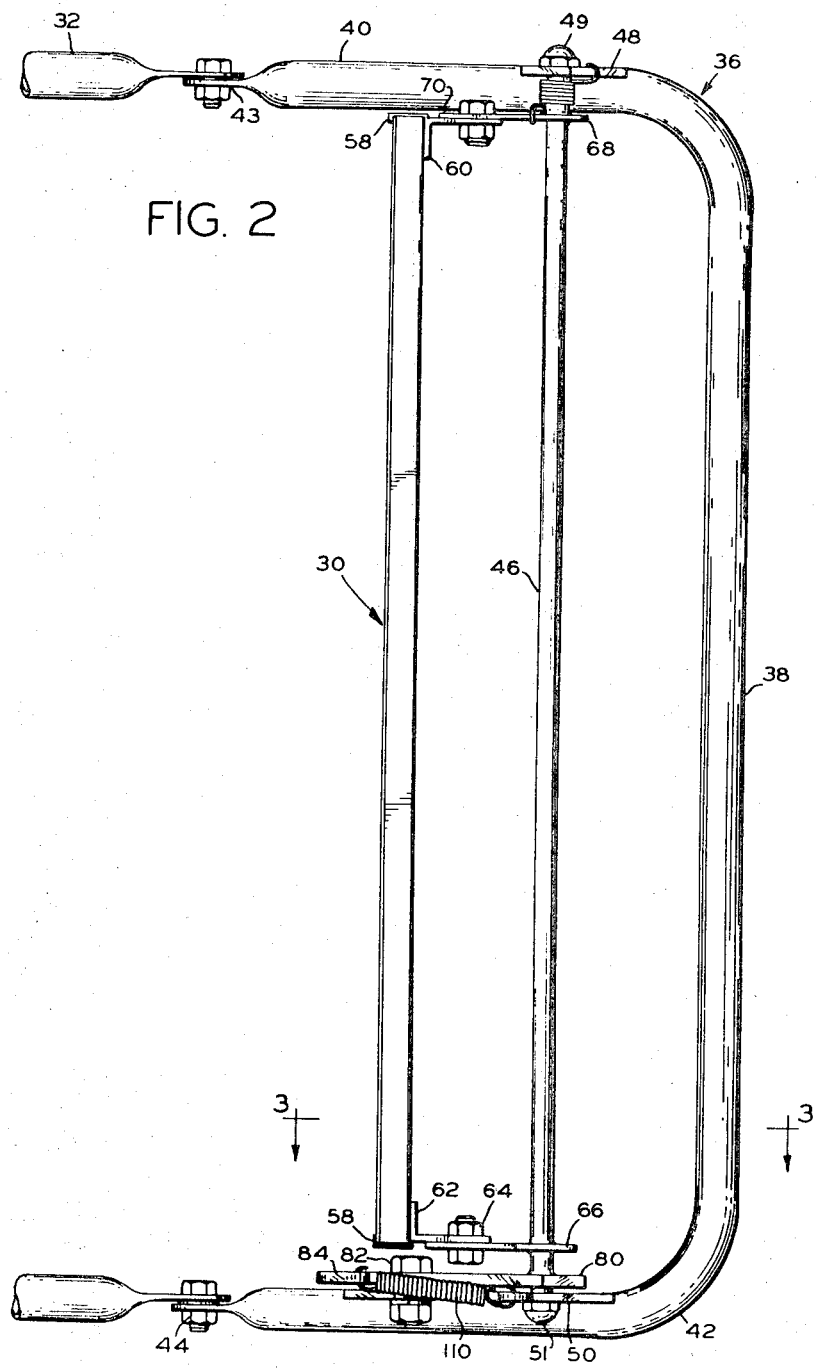

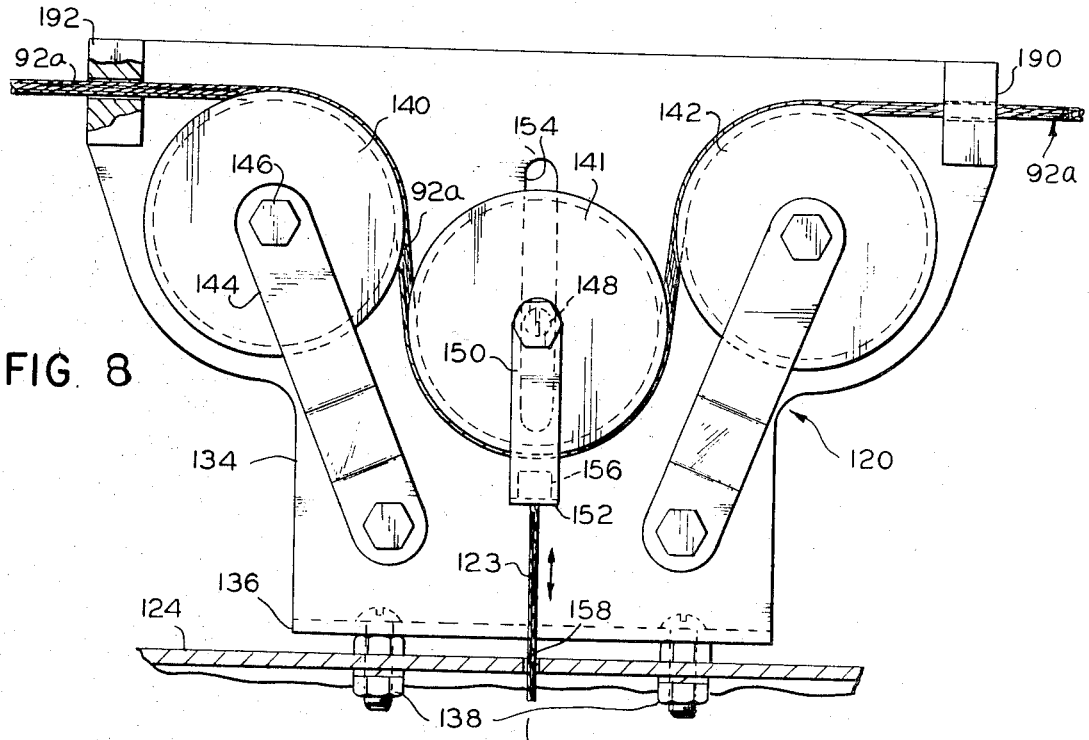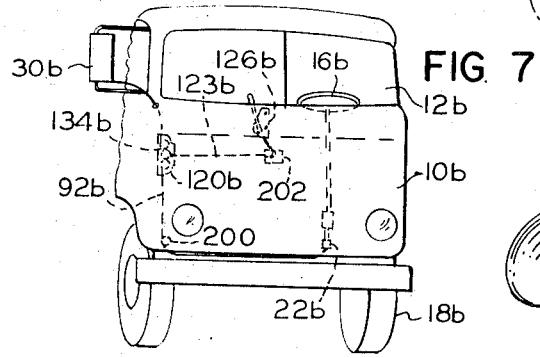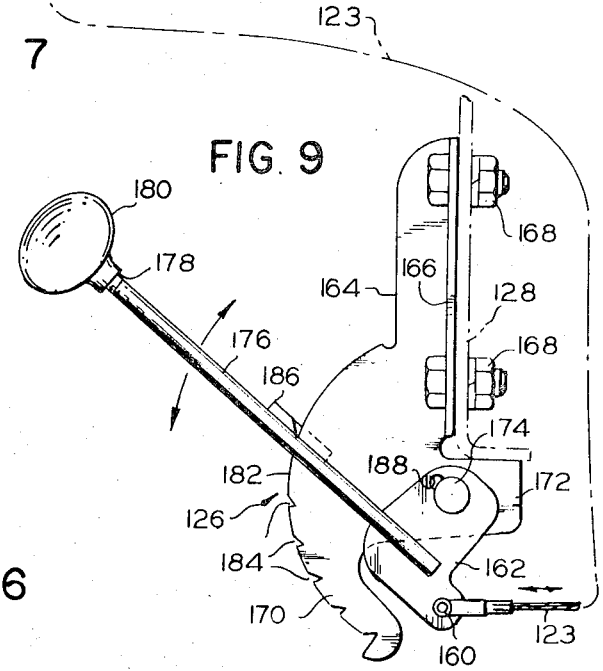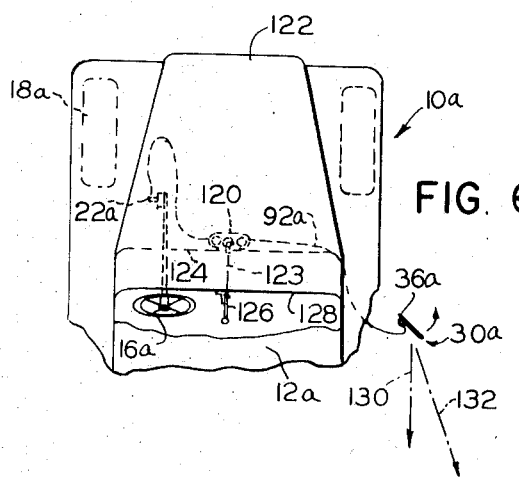

United States Patent Office 3,563,639
Patented Feb. 16, 1971

3,563,639
SELF-TRACKING MIRROR DEVICE WITH
MANUAL OVERRIDE FOR VEHICLES
William F. Bowler, 1623 NE. 104th Ave.,
Portland, Oreg. 97220
Continuation-in-part of application Ser. No. 567,993,
July 26, 1966. This application Aug. 6, 1969, Ser.
No. 848,064
Int. Cl. G02b 5/08
U.S. Cl. 350—307         7 Claims

ABSTRACT OF THE DISCLOSURE

An outside rear-view mirror for a tractor-trailer vehicle combination wherein the angulation of the mirror changes progressively during the course of a turn to provide the vehicle operator with continuous rear vision at and beyond the rear of the trailer. Mirror angulation changes are provided by an operable interconnection between the mirror and the vehicle's steering assembly. A manual override is operably connected to the interconnection and is controlled by the operator in the vehicle cab to enable lane scouting and thereby facilitate lane changes during straight-ahead road travel.

---

This application is a continuation-in-part of my prior copending application Ser. No. 567,993, filed July 26, 1966, for Self-Tracking Mirror Device for Vehicles, now abandoned.

The present invention relates generally to outside rear-view mirrors for tractor-trailer vehicle combinations, and more particularly to a self-tracking rear-view mirror which automatically changes angulation during the course of a turn.

Truck drivers have always been faced with the problem of trying to maintain rear vision at the inside of a curve when negotiating a right or left turn, but the problem is particularly acute when making a right-hand turn because the operator is seated at the left-hand side of the truck. Although others have suggested rear-view mirror devices mounted outside the truck adjacent the driver's compartment which are angularly adjustable in response to turning movement of the tractor or trailing vehicle so that rear vision is maintained, such prior devices have never been wholly satisfactory for various reasons and have never been widely adopted by truck drivers. Some such prior devices have required a linkage connection between the mirror device and the trailing vehicle which is impractical because of the necessity of coupling and uncoupling the linkage, and readjusting the same every time the truck is coupled to and uncoupled from a trailer. Other such prior mirror adjustment devices have depended for their adjustment on a complex linkage with the steering wheel, the steering column, or the steered wheels of the truck in a manner which presents an obstruction to the operator and operation of the vehicle and which is unsightly.

Most prior devices also fail to provide any means for overriding the automatic mirror operating mechanism to provide manual adjustment, which is often desirable, as for example, when changing lanes.

Accordingly, a primary object of the present invention is to provide a rear-view mirror mounting device which is self-tracking throughout the entire course of a turn and throughout turns of different magnitudes.

Another primary object is to provide a self-tracking mirror device as aforesaid which is adjustable for use with different types of tractor vehicles, with different lengths of trailers, and at different positions on a tractor vehicle.

Another primary object is to provide a self-tracking mirror device having means for manually overriding the self-tracking means to permit manual mirror adjustment.

Another important object is to provide a self-tracking mirror device as aforesaid which when adjusted for a given vehicle will not easily come out of adjustment.

Still another important object is to provide a self-tracking mirror device as aforesaid of an improved and simplified construction which provides for trouble-free operation and accurate tracking movement.

A more specific object of the invention is to provide a self-tracking mirror mounting device which adjusts the angulation of the mirror in response to movement of the pitman arm of the vehicle's steering linkage.

A further specific object is to provide a self-tracking mirror device including a unique and positive linkage between the truck's steering linkage and the mirror including a cable-actuated pair of gear segments for providing an accurate and controlled movement of the mirror in response to steering of the vehicle.

Still another object is to provide a self-tracking mirror-mounting device with manual override mechanism which is self-contained on the tractor vehicle and which for the most part is out of sight and out of the way of other operating elements of the vehicle so as to present no hindrance to the operation of the vehicle.

The foregoing and other objects and advantages of the present invention will become more apparent from the following detailed description which proceeds with reference to the accompanying drawing wherein:

FIG. 1 is a somewhat schematic top plan view of a portion of a tractor vehicle having a self-tracking mirror mounting device in accordance with the invention mounted thereon, with a portion of the vehicle being broken away for clarity;

FIG. 2 is an enlarged elevational view of the mirror mounting portion of the invention taken along the line 2—2 of FIG. 1;

FIG. 3 is a horizontal sectional view on a greatly enlarged scale taken along the line 3—3 of FIG. 2 showing details of the mirror-actuating linkage;

FIG. 4 is a view taken along the line 4—4 of FIG. 1 showing the portion of the mirror-actuating linkage connected to the pitman arm of the vehicle's steering linkage on a scale greatly enlarged from that of FIG. 1;

FIG. 5 is a view taken along the line 5—5 of FIG. 4;

FIG. 6 is a view similar to FIG. 1 showing the self-tracking mechanism with a manual override device;

FIG. 7 is a partial front perspective view of a cab-over type truck illustrating the installation of the self-tracking mechanisms with manual override;

FIG. 8 is a plan view of that portion of the manual override mechanism of FIG. 6 positioned inside the front hood of the vehicle; and FIG. 9 is a side elevational view of the control portion of the manual override of FIG. 6 positioned within the vehicle operator's compartment.

With reference to the drawing, FIG. 1 shows the front end of a truck 10 of a truck-trailer combination including a cab portion 12 within which the operator would normally be seated at approximately position 14 behind a steering wheel 16. The truck is provided with the usual pair of front wheels 18 which are steered by a steering linkage 20 with the steering wheel. Such linkage includes as one of its essential components a vertical pitman arm 22 which pivots back and forth about its upper end in response to movement of the steering wheel. The pitman arm is connected at its lower end to the rear end of a drag bar 24, the front end of which is pivoted at 25 to a steering arm 26, which in turn is connected to the left front wheel 18 to turn the same in response to movement of the pitman arm. Wheel 18 is connected by a tie rod 28 to the right-hand front wheel so that both wheels turn in the same direction at the same time.

A rear-view mirror 30 is mounted on the outside of the right-hand side of the truck approximately opposite the operator's position on the left-hand side of the truck by a bracket mounting means which includes the usual inner bracket 32 and support strut 34 of conventional construction and a special outer mounting bracket 36 which is adjustable and comprises part of the present invention.

Referring now to FIG. 2, outer mounting bracket 36 includes an upright elongated C-shaped tubular metal base member 38 including an upper arm portion 40 and a lower arm portion 42. The upper and lower arm portions are flattened at their outer ends 43 and provided with through openings for adjustably connecting the arms to corresponding portions of inner bracket member 32 by means of a nut, bolt and star washer assembly 44. When adjusted, however, member 38 remains rigidly connected to inner bracket 32 and does not move. A vertical pivot rod 46 extends between the upper and lower arms of base member 38 and through an ear 48 on upper arm 40 and through a laterally extending platform member 50 on lower arm 42. Nuts 49, 51 threaded on the opposite ends of the pivot rod retain it in place while permitting it to pivot in its mountings about its longitudinal axis.

Mirror 30 is a conventional rear-view truck mirror adapted for outside installation which includes an elongate metal backing plate 52 having a recessed front surface for receiving mirror glass 54 (FIG. 3) held in place by a peripheral rubber bead 56 and clamping members 58 at the opposite ends of the mirror. Backing plate 52 of the mirror has a pair of angle members 60, 62 fixed thereto at the upper and lower ends thereof with one leg of each projecting rearwardly from the base. The projecting leg of lower angle member 62 and lower clamping member 58 are connected by a nut and bolt assembly 64 to a bar 66 welded to a lower portion of vertical rod 46. The projecting leg of upper angle member 60 and the upper mirror clamping member are bolted to an upper bar 68 welded to an upper portion of rod 46. Upper bar 68 is slotted at its outer end at 70 for receiving the projecting elements of the upper end of the mirror backing plate and to provide a vertical tilting adjustment of the mirror. From the foregoing it will be apparent that the mirror is rigidly but adjustably clamped to the pivot rod so that the mirror will pivot with the rod about the vertical axis of the latter.

The mirror and pivot rod are pivoted about the rod axis in response to movement of the pitman arm 22 of the truck's steering linkage by a unique linkage means interconnecting the pitman and the rod. This linkage includes as two of its key elements a pair of intermeshing gear segments 76, 78 carried at the lower end of the outer mounting bracket. Gear segment 76 has a rearward extension 80 which is fixedly secured as by welding to a lower portion of pivot rod 46 just below mirror mounting bar 66. Gear segment 78 is mounted at 82 to platform 50 for pivotal movement about a vertical axis through the center of curvature of the gear segment. The axis of pivoting movement of gear segment 76 is, of course, coincident with the center of curvature of the gear segment. Gear segment 80 has an integral lever arm 84 which projects rearwardly beyond the platform itself. The arm has a series of aligned openings 86 through one of which a pin 88 of a yoke member 90 extends for pivotally connecting one end of an actuating cable 92 to the lever arm. The major portion of cable 92 is encased by a sheathing 94 through which the cable slides when pushed or pulled.

As shown in FIG. 1, cable 92 extends from its connection with lever arm 84 of gear segment 78, then beneath the hood of the truck and along the rearmost wall of the compartment beneath the hood, and finally down through a wall in such compartment to a connection with pitman arm 22. It has been found that copper tubing 95 serves admirably as a rigid guideway through which the cable extends beneath the hood for directing the cable in the desired path. In this manner the cable can be guided out of sight and clear of other truck parts to the pitman arm through its major extent with only the short cable portion between the right-hand side of the hood and the mirror itself being visible from outside the truck.

The cable connection at the pitman arm, shown in FIGS. 4 and 5, comprises a clamp 96, including a U-bolt 97 and channel-shaped clamping element 98, which bolts directly to the pitman arm. Included in the clamping assembly directly behind channel 98 is a T-shaped plate 100, the head of which is disposed vertically and has a series of vertically aligned openings 102. One end of cable 92 extends from one side of plate 100 through one of the openings and is dead-ended in place on the opposite side of the plate by dead-end member 104. Vertically aligned openings 102 are a means providing an adjustable cable throw. That is, the closer the cable is connected to the lower end of the pitman arm, the greater will be the cable throw for a given amount of pitman movement. The amount of throw necessary for proper tracking movement of the mirror might vary from truck to truck and will vary with trailers of different lengths used with the same truck. Adjustment of the angular variation of the mirror upon movement of the pitman arm can also be controlled to some extent at lever arm 84, and in most instances it will be easiest to make adjustment, initially at least, at the lever arm.

In operation, movement of the pitman arm in a forward direction in making a left-hand turn of the truck throws slack in the actuating cable so that the mirror remains in its initial position of adjustment. However, movement of the pitman arm rearwardly in making a right-hand turn pulls the pitman end of actuating cable 92 rearwardly also to pivot lever arm 84 and its connected gear segment 78 in a clockwise direction as viewed in FIG. 3. This in turn rotates gear segment 76 and its connected pivot rod and mirror counterclockwise to decrease the angle of incidence between the operator's direct line of sight L (FIG. 1) and the mirror and thereby decrease the angle of reflection between the mirror and the operator's reflected rearward line of sight L'. This results in a shifting of the rearward line of sight through an angle A from its initial position $L'_a$ to an adjusted position $L'_b$ so that the operator has continuous rear vision through all degrees of turning movement and all phases of the turn.

A return spring 110 is connected at one end to the outer end of lever arm 84 and at its opposite end to a lateral projection 111 of platform 50 to continually urge the lever arm and thus the mirror to its initial position of adjustment and thus insure that the mirror returns to its initial position upon completion of each right-hand turn. The initial position of adjustment of the mirror is determined by a set screw 112 which is threaded through a nut member 114 welded to the platform. One end of the set screw abuts a side edge of gear segment 76 to prevent clockwise rotation of such segment, and thus the mirror, beyond their predetermined initial positions of adjustment providing the operator with rear vision when the truck is proceeding in a straight path.

Spring biasing is also provided between ear 48 and slotted upper mirror mounting bar 68 by a coil spring 116 encircling pivot rod 46 between the two such members and urging the mirror to its initial position of adjustment. The upper spring eliminates any tendency of the upper end of the pivot rod to bind in its upper pivotal mounting.

With a self-tracking mirror mount as aforesaid, the mirror will track throughout all phases of a right-hand turn to provide the operator with continuous rear vision on the right-hand side of the vehicle so that the rear of the trailing vehicle is always in view.

Although the invention has been described with respect to an outside rear-view mirror for the right-hand side of the vehicle, it will be apparent that the same mirror mounting device can be adapted for mounting an outside rear-view mirror on the left-hand side of the vehicle through a simple reversal of parts or, alternatively, simply by reversing the position of the upper and lower arms of the outer bracket on the left-hand side of the truck and then connecting the actuating cable to the pitman arm so that the lever of gear segment 78 is actuated by a forward movement of the pitman arm.

In FIG. 6 a self-tracking mirror device as in FIG. 1 is provided with a manual override means 120 connected to actuating cable 92a extending between mount 36a for the mirror 30a and the pitman arm 22a of the steering assembly for steerable wheels 18a. The manual override is mounted inside hood 122 of the conventional truck 10a and is connected by an actuating cable 123 extending through firewall 124 of the truck to a manual override control 126 mounted on dashboard 128 inside the driver compartment 12a so that a driver at steering wheel 16a can selectively control angulation of mirror 30a independently of the direction of the steerable wheels. The manual override functions to override the normal automatic operation of mirror 30a acting under the influence of cable 92a in response to movement of pitman arm 22a so that the angulation of the mirror can be manually adjusted at any time independently of the operation of the steering assembly. This permits a driver who is driving straight ahead down a highway in one lane to change the normal rearward line of sight in the direction of arrow 130 to a rearward line of sight in the direction of arrow 132 to scout road lanes to the driver's right before changing lanes.

As shown in FIG. 8, the manual override device 120 includes a horizontal base plate 134 having a downturned rear flange 136 which is attached to firewall 124 inside the front hood by fasteners 138. Three pulley wheels 140, 141, 142 are rotatably mounted on the upper surface of base plate 134. Outermost pulley wheels 140 and 142 are mounted in fixed positions on the base plate at equal distances from firewall 124 so as to be aligned with one another transversely of the vehicle between the upper surface of the base plate and a pair of mounting arms 144 for rotation about shaft portions of fastener pins 146. Center pulley wheel 141 is mounted for rotation about the shaft of a fastener pin 148 between the lower arm (not shown) and upper arm 150 of a yoke member 152. Pin 148 not only connects pulley 141 to yoke 152, but also continues through a longitudinally extending slot 154 and is dimensioned so that it can slide longitudinally within such slot.

The rear end of pulley yoke 152 has an opening therethrough which the forward end of pull cable 123 extends. Inside the yoke, the forward end of the pull cable is fastened to an enlarged anchor member 156. Control cable 123 extends rearwardly from yoke 152 through an opening 158 in firewall 124 and emerges in the driver's compartment of the vehicle cab beneath dashboard 128 where it is connected at its rear end by a pin to an actuating lever 162 of the override control 126, as shown in FIG. 9. Override control 126 includes a projecting body portion 164 having a flange portion 166 which is secured by fasteners 168 to the dashboard. The body portion includes a curved, downwardly projecting lower portion 170 which includes a forward projection 172 extending beneath the dashboard to which actuating lever 162 is pivoted at 174. A control handle shaft 176 is fixed to actuating lever 162 and extends upwardly and rearwardly from such lever to a threaded rear end 178 which receives a handle knob 180 to facilitate pivoting movement of actuating lever 162 by the driver. Curved portion 170 has an arcuate outer periphery 182 provided with a series of ratchet-like notches 184 at spaced intervals for receiving a locking projection 186 on handle shaft 176 to lock the handle in a preselected position of adjustment. Projection 186 is inserted in any one of notches 184 by a forward pushing force applied to knob 180 by the operator, the effect of which is to move shaft 176 forwardly as permitted by a slot 188 in lever 162 through which connecting pin 174 extends. To release the handle from a notch, the knob is pulled rearwardly.

Mirror-actuating cable 92a extends between actuating means 84 (FIG. 3) for actuating the pivot means 46 of the mirror and pitman arm 22a. An intermediate portion of cable 92a is trained about the forwardmost peripheries of the outer pair of pulleys 140, 142 and about the rear periphery of center pulley 141 in the manner shown in FIG. 8. Mounting base 134 also includes a pair of line guides 190, 192 at its opposite forward corners which guide mirror cable 92a and determine the cable's general path of travel in the region of the pulleys. The guides also serve to maintain cable 92a in proper alignment with pulleys 140 and 142. Pulley 141 is shown in FIG. 8 in its normal position of adjustment relative to slot 154 when the truck is moved straight ahead and the mirror is adjusted at an angle to provide a straight rearward line of sight in the direction of arrow 130 in FIG. 6. In this position of adjustment, the axis of center pulley 141 is positioned rearwardly of the axes of outer pulleys 140, 142 a distance such that a direct rearward pull on control cable 123 through a given lineal distance will produce an equal amount of lineal take-up of actuating cable 92a of the mirror in a direct 1:1 ratio. This feature provides a uniform predictable change in angulation of the mirror for any given amount of upward and forward movement of control handle 176 from its normal position of adjustment in the uppermost notch 184 of FIG. 9.

In FIG. 9, handle 176 is shown in a lane-scouting position above upper notch 184 to provide a rearward line of sight in the direction of arrow 132 of FIG. 6. However, when handle 176 is locked in upper notch 184, center pulley 141 is in its normal position as shown in FIG. 8 to provide the driver with a direct rearward line of sight through the mirror when the truck is proceeding straight ahead. To use the override as a lane scouter when the truck is proceeding in this manner, the driver first pulls on handle 176 to release the handle from its notched position and then pushes the handle upwardly and progressively forwardly and rearwardly as desired to scout the lanes to the right of the truck and thereby determine whether it is safe to change lanes. Forward and upward movement of handle 176 pivots lever 162 clockwise in FIG. 9 about the axis of pin 174, and the lever in turn pulls control cable 123 rearwardly. Rearward movement of cable 123 slides center pulley 141 rearwardly in its slot 154, taking up that portion of mirror-actuating cable 92a extending toward the right in FIG. 8 in a 1:1 ratio. There is no take-up of that portion of cable 92a extending toward the pitman arm since that end of the cable is dead ended at the pitman arm, which remains in a fixed position so long as the truck proceeds straight ahead. Of course, the overriding action of cable 123 is effective to override the steering-controlled self-tracking feature regardless of the position of the pitman arm and steerable truck wheels.

Although the topmost notch 184 of control member 164 provides the normal position of adjustment for the mirror, the other notches provide other fixed positions of adjustment of the mirror should these be necessary or desired as in backing situations, without requiring the driver to adjust the cables. Also, by providing sufficient forward extension of pulley slot 154 and by moving handle 176 all the way down to its extreme lower notched position, a sufficient slack could be developed in mirror-actuating cable 92a to deactivate the self-tracking feature of the mirror should this ever be desired, as for example, during normal highway travel. In such event, the stop 112 shown in FIG. 3 would determine the spring-biased position of adjustment of the mirror 30.

From the foregoing it will be apparent that the overriding mechanism of FIG. 8 and the means for controlling the same of FIG. 9 provide an effective manually controlled override which permit lane scouting and deactivation of the self-tracking feature when desired.

FIG. 7 illustrates application of the apparatus of FIGS. 8 and 9 to a cab-over type of truck 10b having no forward hood in the sense of the conventional truck of FIG. 6 but including the usual driver's compartment 12b, steering wheel 16b and pitman arm 22b controlling the steerable front wheels 18b. The cab-over truck has a mirror 30b and control mechanism therefor exactly as described with respect to FIGS. 1 through 5, including a mirror-actuating cable 92b extending from the mirror pivot actuating means to the pitman arm 22b of the steering assembly as shown. However, the override means 120b corresponding to the means 120 of FIG. 8 would have its base plate 134b mounted in a vertical position between the extreme front end of the truck and the driver's compartment, with the three pulleys extending in a vertical alignment as shown. The actuating cable 92b would thus extend downwardly about the three pulley wheels and then about a guide pulley 200 and then horizontally to pitman arm 22b. The control cable 123b extends horizontally from the center pulley wheel to a guide wheel 202 from which the control cable extends rearwardly and through the firewall to the override control 126b within the driver's compartment 12b of the truck. Otherwise the operation of the override for the cab-over truck of FIG. 7 would be exactly the same as described with respect to the override of FIGS. 6, 8 and 9.

Having illustrated and described what are presently preferred embodiments of my invention, it should be apparent to those having skill in the art that the same permits of modification in arrangement and detail. I claim as my invention all such modifications as come within the true spirit and scope of the following claims.

I claim:

1. In a tractor-trailer vehicle combination wherein the tractor has a driver compartment and steering assembly operable from the driver compartment and connected to the steerable wheels of the tractor,
  a side view mirror adjusting apparatus including mirror-mounting means adapted for mounting a side view mirror on the outside of the tractor to provide a rear line of vision from the driver's compartment,
  said mounting means including pivot means mounting said mirror for pivotal movement about an upright axis to provide a changeable rear line of vision,
  pivot-actuating means carried by said mounting means and operably connected to said pivot means for changing the angulation of said mirror and thus the rear line of vision from said driver's compartment,
  means operably interconnecting said pivot-actuating means and a movable element of said steering assembly in a manner such that movement of said element to change the direction of said steerable wheels effects a corresponding change in the angulation of said mirror to provide continuing rearward line of vision from the driver's compartment during the course of a turn,
  overriding means operably connected to said interconnecting means for overriding the action of said interconnecting means in controlling changes in the angulation of said mirror wherein said overriding means includes manually operable control means operable to actuate said overriding means from said driver's compartment to change the angulation of said mirror independently of changes in movement of said steering element.

2. Apparatus according to claim 1 wherein said interconnecting means includes cable means extending between said pivot-actuating means and said movable steering element, said override means including means engaging said cable means between said actuating means and said steering element.

3. Apparatus according to claim 2 wherein said engaging means is movable in a direction transverse to the general direction of extension of said cable means in the region of said engagement to provide a variable take-up of said cable means for changing the angulation of said mirror independently of movement of said steering element.

4. Apparatus according to claim 3 wherein said engaging means includes movable pulley wheel means.

5. Apparatus according to claim 1 wherein said control means includes actuating means extending from said interconnecting means into said driver's compartment, pivotable handle means for controlling the operation of said actuating means, and means for locking said handle means in various positions of adjustment.

6. Apparatus according to claim 2 wherein said engaging means includes a series of at least two pulley wheel means with said cable means being trained about said pulley means, one of said pulley means being movable lineally in a direction transverse to the general direction of extension of said cable means in the region of said pulley means, the other of said pulley means being fixed against lineal movement in said transverse direction, and control means for moving said movable pulley means in said transverse direction from within said driver's compartment, whereby movement of said movable pulley means in one transverse direction effectively takes up said cable means to change the angulation of said mirror independently of the movement of said steering linkage.

7. A device for changing the angulation of a side view mirror for a vehicle comprising:
  means for mounting said side view mirror on the side of a vehicle to provide a rearward line of vision from a driver compartment of the vehicle,
  said mounting means including pivot means for mounting said mirror for pivoting movement about an upright axis to change the rearward line of vision from said mirror,
  actuating means carried by said mounting means for actuating said pivot means,
  and remote control means extending from said actuating means to said driver's compartment for enabling control of the angulation of said mirror from said driver's compartment,
  said remote control means including cable means connected at one end to said actuating means and extending therefrom within the front of said vehicle forwardly of said driver's compartment,
  pulley wheel means within the forward end of said vehicle forwardly of said driver's compartment,
  said cable means extending about said pulley means and thence into said driver compartment,
  control lever means pivotally mounted within said driver compartment,
  said cable means being connected to said lever means at a position offset from said pivotal mounting,
  said lever means including means for moving said lever means about its pivot axis and for selectively locking said lever means in preselected positions of adjustment, whereby the angulation of said mirror may be selectively changed from said driver's compartment and maintained in preselected positions of adjustment.

References Cited

UNITED STATES PATENTS 2,854,892 10/1958 Stark.
3,469,901 9/1969 Cook et al.

DAVID SCHONBERG, Primary Examiner

M. J. TOKAR, Assistant Examiner